US 12,175,764 B1

(12) United States Patent
Song et al.

(10) Patent No.: US 12,175,764 B1
(45) Date of Patent: Dec. 24, 2024

(54) LEARNED DECONVOLUTIONAL UPSAMPLING DECODING LAYER

(71) Applicant: Zoox, Inc., Foster City, CA (US)

(72) Inventors: Qian Song, San Mateo, CA (US); Benjamin Isaac Zwiebel, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 423 days.

(21) Appl. No.: 17/537,843

(22) Filed: Nov. 30, 2021

(51) Int. Cl.
*G06V 20/00* (2022.01)
*B60W 60/00* (2020.01)
*G06N 3/04* (2023.01)
*G06V 20/58* (2022.01)
*G06V 20/64* (2022.01)

(52) U.S. Cl.
CPC ......... *G06V 20/58* (2022.01); *B60W 60/0027* (2020.02); *G06N 3/04* (2013.01); *G06V 20/64* (2022.01); *B60W 2520/12* (2013.01); *B60W 2520/14* (2013.01)

(58) Field of Classification Search
CPC ... G06V 20/58; G06V 20/64; B60W 60/0027; B60W 2520/12; B60W 2520/14; G06N 3/04
See application file for complete search history.

(56) References Cited

U.S. PATENT DOCUMENTS

| | | | |
|---|---|---|---|
| 2020/0175353 A1* | 6/2020 | Kim | G06N 3/045 |
| 2021/0004611 A1* | 1/2021 | Garimella | G06T 11/60 |
| 2021/0192748 A1* | 6/2021 | Morales | G05D 1/0221 |
| 2021/0342609 A1* | 11/2021 | Smolyanskiy | B60W 60/0027 |
| 2023/0038673 A1* | 2/2023 | Masoud | B60W 30/095 |

* cited by examiner

*Primary Examiner* — Ping Y Hsieh
*Assistant Examiner* — Xiao Liu
(74) *Attorney, Agent, or Firm* — Lee & Hayes, P.C.

(57) ABSTRACT

Techniques for performing deconvolution operations on data structures representing condensed sensor data are disclosed herein. Autonomous vehicle sensors can capture data in an environment that may include one or more objects. The sensor data may be processed by a convolutional neural network to generate condensed sensor data. The condensed sensor data may be processed by one or more deconvolution layers using a machine-learned upsampling transformation to generate an output data structure for improved object detection, classification, and/or other processing operations.

20 Claims, 4 Drawing Sheets

LEARNED DECONVOLUTIONAL UPSAMPLING DECODING LAYER

BACKGROUND

Various systems and techniques are utilized by autonomous vehicles to perform detection and tracking of objects, such as vehicles, pedestrians, and bicycles, in an environment. Detection and tracking techniques may use sensors to capture data in an environment and use this sensor data to detect objects in the environment. Because such data may be voluminous, captured environment data may be condensed into a reduced dataset for increased processing efficiency. To improve detection and tracking capabilities, a condensed dataset of environment data can be expanded to generate an approximation of the originally captured environment data. A static upsampling factor can be used to upscale the condensed dataset to an approximation of the originally captured environment data. However, upscaling using a static upsampling factor can result in imprecise upsampling, leading to a resulting lower resolution dataset. By using a lower resolution approximate of the originally captured environment data, object detection and tracking may be less accurate. Accurately and efficiently expanding condensed datasets to generate an accurate approximation of originally captured environment data may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for deconvolving data structures representing multichannel environment data may include using a machine-learned deconvolution upsampling transformation. In conventional neural networks (CNNs), the convolutions performed on input datasets at one or more convolution layers may generate output datasets that are typically smaller and more condensed (e.g., containing less data or containing data at a lower level of detail) than the input datasets. When such datasets include image data, the resolution (e.g., spatial resolution) of the output dataset is typically reduced compared to the input dataset. In an example where a discretized region of input data represents an area of an environment, such as 1 meter×1 meter, convolution operations may result in a discretized region of an intermediate data representing a larger area, such as 5 meters by 5 meters. To perform object detection and tracking (e.g., object bounding box determinations) using output from the convolution layers of a CNN, the condensed output data may be deconvolved to increase the spatial resolution of image data in the output dataset. In conventional techniques, this deconvolution is performed using element-wise addition and/or multiplication by performing bilinear interpolation of the condensed dataset using a static upsampling factor (e.g., multiplier). However, the use of a static upsampling factor in a deconvolution operation may lead to lower spatial resolution dataset or lead to imprecise upsampling and therefore less accurate object detection and tracking.

In examples, a learned deconvolutional upsampling decoding layer may be implemented in a CNN that uses a machine-learned upsampling transformation to perform operations similar to bilinear interpolation but resulting in improved spatial resolution of the output data of the learned deconvolutional upsampling decoding layer. This in turn improves object detection, localization, and tracking.

The systems and techniques described herein may be directed to leveraging sensor data and neural networks to enable a vehicle, such as an autonomous vehicle, to more accurately identify objects in an environment and therefore navigate through the environment more safely by circumventing such objects. The systems and techniques described herein can utilize ML models to determine more effective upsampling transformations for use in deconvolution operations. The systems and techniques described herein can then utilize the machine-learned upsampling transformations to perform deconvolution of condensed multichannel data structures to generate upscaled and higher spatial resolution data structures that facilitate more accurate detection of objects. By using machine-learned upsampling transformations as described herein to generate higher spatial resolution or more accurate data structures representing an environment, the examples described herein may result in increased certainty of object detections, thereby allowing an autonomous vehicle to generate more accurate and/or safer trajectories for the autonomous vehicle to traverse in the environment.

For example, techniques described herein may be faster and/or more robust than conventional techniques, as they may increase the reliability of the determination of dimensions and other physical parameters of objects in the environment, reducing the likelihood of failing to identify or misidentifying an object. That is, techniques described herein provide a technological improvement over existing object detection, classification, tracking, and/or navigation technology. In addition to improving the accuracy with which upscaled data structures can be used to determine objects and correctly localize such objects, the systems and techniques described herein can provide a smoother ride and improve safety outcomes by, for example, more accurately providing safe passage to an intended destination.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving objects or entities having dimensions and/or other physical parameters that may not be known to the system. Further, although discussed in the context of originating with particular types of sensor data and processing with particular types of components, data and data structures as described herein can include any two-dimensional, three-dimensional, or multi-dimensional data such as other types of image data (e.g., stereo cameras, time-of-flight data, and the like)), radar data, sonar data, and the like. Additionally, the techniques described herein can be used with real data (e.g., captured using sensor(s)), simulated data (e.g., generated by a simulator) or any combination of the two.

Figure 1:
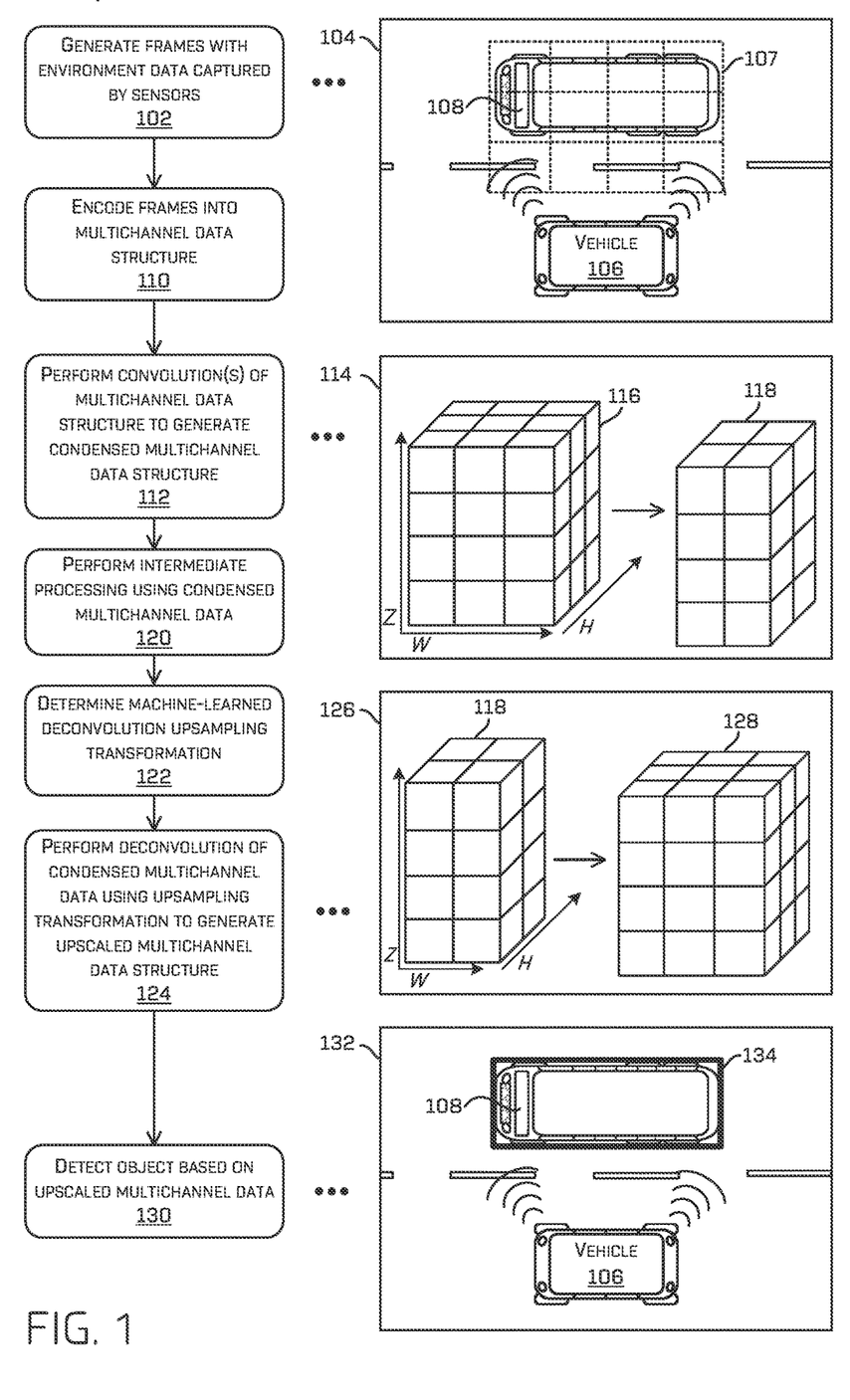
FIG. 1 a pictorial flow diagram of an example process for convolving and deconvolving captured environment data, in accordance with examples of the disclosure.
Figure 2:
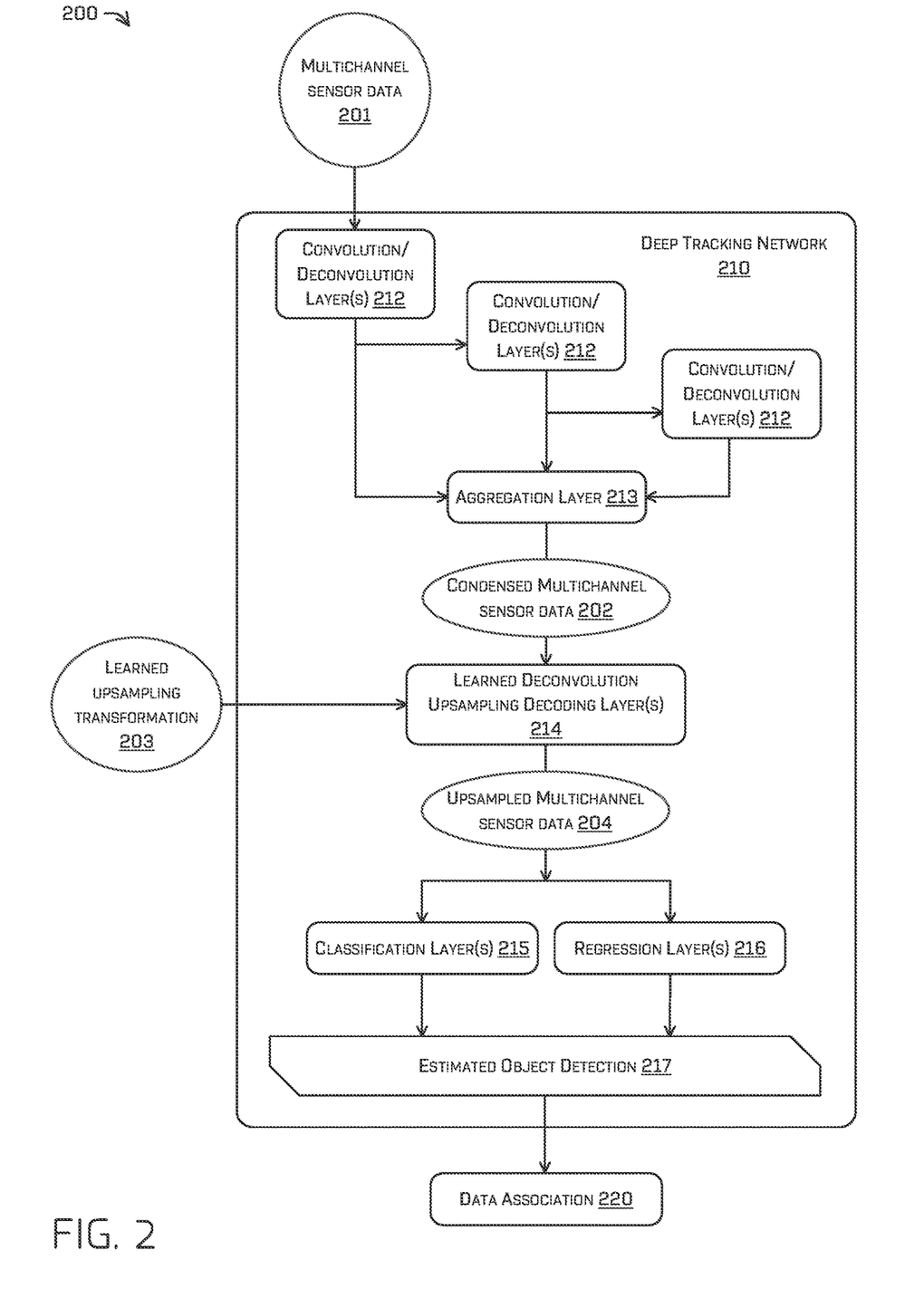
FIG. 2 is a diagrammatic representation of machine-learned object detection network, in accordance with examples of the disclosure.
Figure 4:
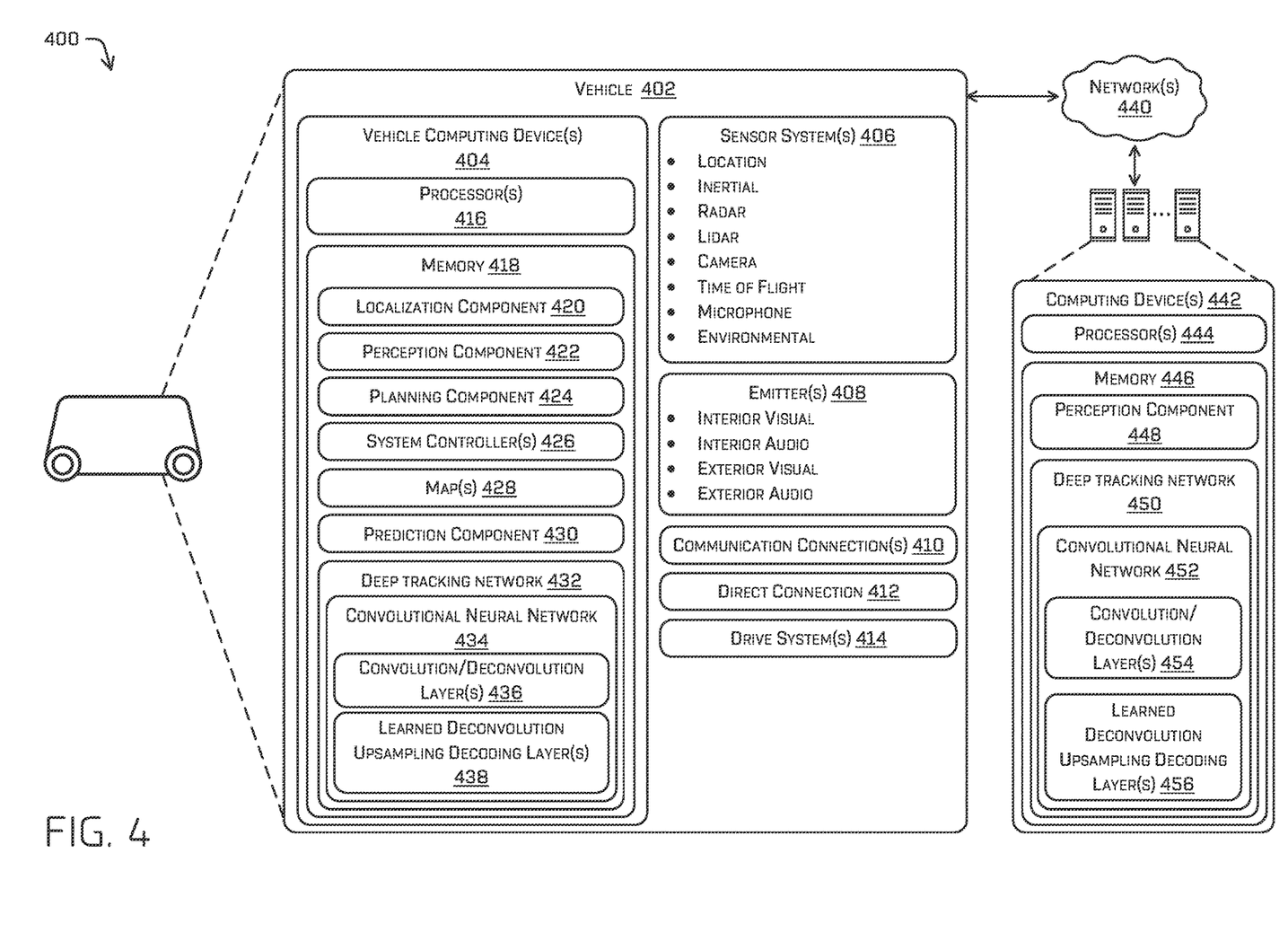
FIG. 4 depicts a block diagram of an example system for implementing the techniques described herein.

FIG. 1 is a pictorial flow diagram of an example process 100 for generating data for use in object detection and tracking. In examples, one or more operations of the process 100 may be implemented by a vehicle computing system, such as by using one or more of the components and systems illustrated in FIGS. 2 and 4 and described below. For example, one or more components and systems can include those associated with a deep tracking network 210 illustrated in FIG. 2 and/or a deep tracking network 432 illustrated in FIG. 4. In examples, the one or more operations of the process 100 may be performed by a remote system in communication with a vehicle, such as the deep tracking network 450 illustrated in FIG. 4. In still other examples, the one or more operations of the process 100 may be performed by a combination of a remote system and a vehicle computing systems. However, the process 100 is not limited to being performed by such components and systems, and the components and systems of FIGS. 2 and 4 are not limited to performing the process 100.

At operation 102, sensors configured at or otherwise associated with an autonomous vehicle may detect data in an environment and generate one or more frames based on such data. In various examples, the sensors may include one or more lidar sensors, camera sensors, radar sensors, sonar sensors, ultrasonic transducers, audio sensors, and/or any other suitable sensors. The data captured by such sensors may be generated as frames that include image and/or pixel data and data associate therewith. For example, the frames generated based on sensor detections may include location data (e.g., center coordinates), detected area (e.g., dimensions), and image detection data. Such frames may also include temporal data, such as a time of capture and/or generation of an individual frame. Individual sensor and/or types of sensors may generate their own individual frames. For example, a lidar sensor may generate its own lidar data frames, a sonar sensor may generate its one sonar data frames, etc.

An example 104 illustrates a top-down view of an image of an environment that includes a vehicle 106 that may be configured with sensors to detect objects in the environment, such as an object 108. The sensors configured at the vehicle 106 may be configured to detect environment data in the area of a grid 107. The sensors may be configured to generate environment data for each section of the grid 107 and data indicating characteristics of those sections, such as location, dimensions, size, etc. This data may be generated and/or stored as frames.

At operation 110, a vehicle computing system may encode frames representing environment data and associated data into a multichannel data structure. A particular (e.g., 5, 10, 25) or variable number of frames (e.g., captured over time) may be encoded into the multichannel data structure. In various example, a multichannel data structure may be a multilayered data structure with the individual layers representing data associated with particular sensors or sensor systems (e.g., channels). For example, one layer may contain lidar data, one may contain sonar data, one may contain radar data, etc. Individual layers of a multichannel data structure may also, or instead, represent other types of data, such as time, features, map data, velocity, etc. In examples, the multichannel data structure is a tensor data structure with environment data encoded into the height and width dimensions (H and W, may also be referred to as the x and y axes) and layers associated with various sensors represented on the z axis (may also be referred to as channels or channel layers), as described in more detail herein (see, e.g., FIG. 3 and the associated description). A single layer data structure (e.g., a tensor data structure having one layer) may be used with the systems and techniques described herein.

At operation 112, the vehicle computing system may perform one or more convolutions of the data represented by the multichannel data structure generated at operation 110. For example, a CNN configured at, or otherwise associated with, the vehicle computing system may process the multichannel data structure through one or more convolution layers configured at the CNN to generate an output data structure representing a condensed multichannel data structure. In examples, this condensed multichannel data structure represents the same area in the environment as the original multichannel data structure. For instance, individual boxes (e.g., blocks of data) in the layers of the original multichannel data structure may include data representing a one meter by one meter (1 m×1 m) section of an environment (e.g., in top-down perspective). After processing of the original multichannel data structure by the convolution layer(s), individual boxes of the layers of the condensed multichannel data structure may include data representing a five meter by five meter (5 m×5 m) section of the environment. In examples, individual boxes of the layers of the condensed multichannel data structure may include data representing any multiple or fraction of a multiple of one or more sections of the environment (e.g., a 4.9 m×4.9 m section, a 5.1 m×5.1 m section, etc.). In some examples, this may be due to the nature of a machine learned model as a type of approximation function, limitations in the accuracy of number or calculations, and the like.

An example 114 illustrates a multichannel data structure 116 that may have been, for example, generated at operation 110 by the vehicle computing system of the vehicle 106 based on sensor detections performed in the example environment 104. The z axis layers of the data structure 116 may be associated with data generated by a particular sensor or sensor system configured at the vehicle 106. The H and W axes of the data structure 116 (representing the height and width of a top-down view) delineating the individual boxes of the individual layers (also referred to as cells or discretized regions) may represent data associated with a particular section of the example environment 104. Thus, a particular box in a particular layer of the data structure 116 can represent data collected by a particular sensor for a particular top-down section of the environment 104.

A multichannel data structure 118 is also illustrated in the example 114. The multichannel data structure 118 may be the output data structure generated by the convolution layer(s) of a CNN that processed the multichannel data structure 116. Thus, the multichannel data structure 118 represents a condensed version of the environment data of the multichannel data structure 116. As with the data structure 116, the z axis layers of the data structure 118 may be associated with data generated by a particular sensor or sensor system configured at the vehicle 106 because the convolution layer(s) do not affect this aspect of a processed data structure. However, the H and W axes of the data structure 118 delineate individual boxes of the individual layers that represent data associated with multiple boxes of the corresponding layer in the data structure 116. Thus, a particular box in a particular layer of the data structure 118 represents data collected by a particular sensor for a several particular top-down sections of the environment 104. As will appreciated, because the multichannel data structure 116 and the multichannel data structure 118 may represent the same portion of an environment, the multichannel data structure 118 may have less resolution data than that of the multichannel data structure 116. In other words, the spatial resolution of the output of the convolution layer may be (e.g., much) less than the spatial resolution of the input to the convolution layer input.

Because multichannel data structure output of the convolution layers of a CNN may more efficiently represent the data collected by sensors in an environment, such output may be used for a variety of processing and other activities, which may be performed at operation 120. For example, features of objects and details of an environment may be accentuated in such output and therefore may be more readily detected and/or categorized by various operations that may be performed by, for example, an autonomous vehicle. However, a set of data of the same or similar size as the original multichannel data structure generated by a vehicle's sensors may be desirable for performing object detection, localization, and tracking functions. Such functions may be more effectively implemented using higher resolution dataset.

At operation 122, a machine-learned deconvolution upsampling transformation may be determined for use in a learned deconvolutional upsampling decoding layer of a CNN. In examples, a stored machine-learned deconvolution upsampling transformation may be retrieved. This stored machine-learned deconvolution upsampling transformation may have been generated previously using a machine learning process. For example, a machine-learning (ML) model may be trained to output a deconvolution upsampling transformation by initializing the ML model with deconvolution parameters based on an initial, static upsampling factor and then processing a training set of data using variations of the initial, static upsampling factor until a highest quality machine-learned deconvolution upsampling transformation is detected. For example, the ML model may perform variations of bilinear interpolation using the variations of the initial upsampling factor and/or weighting of various parameters to generate output datasets. A highest quality machine-learned deconvolution upsampling transformation may be determined by a comparison to one or more criteria, such as the spatial resolution quality of the upsampled dataset resulting from deconvolution using a particular upsampling transformation as compared to the spatial resolution quality of upsampled datasets resulting from deconvolution using other upsampling factors.

At operation 124, the vehicle computing system may perform a deconvolution of the condensed multichannel data structure generated at operation 112 to generate an upscaled multichannel data structure. At the operation 124, one or more deconvolution operations may be performed on the condensed multichannel data structure generated at operation 112 using the machine-learned deconvolution upsampling transformation determined at operation 122. In examples, the same machine-learned deconvolution upsampling transformation may be used for performing deconvolution operations on the layers of the condensed multichannel data structure. The resulting output of these one or more deconvolution operations may be an upscaled multichannel data structure that may have the same size (e.g., dimensions) and/or spatial resolution as the original multichannel data structure used as input to the operation 112, with particular boxes in the individual layers corresponding to particular sections of the detected environments. As in the convolution process, the deconvolution process may not affect the sensor dimension (z axis) of the input multichannel data structure. The vehicle computing system may also, or instead, use temporal information associated with the data represented by the condensed multichannel data structure generated at operation 112 to perform the deconvolution operations on the layers of the condensed multichannel data structure. For example, data associated with the frames that originated the data represented by the condensed multichannel data structure may include time of capture and/or time of generation information. This temporal data may be using in performing the upsampling of the condensed multichannel data structure to generate the upscaled multichannel data structure.

The vehicle computing system may use data encoded in on or more channels of a multi-channel image during learned deconvolution differently depending on the type of data. For example, a deconvolution may act on data encoding a bounding box on a first channel and data indicating a center of the bounding box on a second channel. As disclosed herein, multi-channel image data can include data or metadata encoded into multiple channels wherein each channel may represent a different category of data (bounding box image data, velocity data, location data, classification data, etc.). A learned deconvolutional upsampling decoding layer may act to deconvolve the bounding box image data, for example, using data extracted from other channels.

An example 126 illustrates the multichannel data structure 118 that was the output data structure generated by the convolution layer(s) of a CNN that processed the multichannel data structure 116 at operation 112. At operation 124, a machine-learned deconvolution upsampling transformation may have been used to generate an upscaled multichannel data structure 128. The z axis layers of the data structure 128 may be associated with data generated by a particular sensor or sensor system configured at the vehicle 106. The H and Y axes (representing the height and width of a top-down view) of the data structure 128 delineating the individual boxes of the individual layers may represent upsampled data from the condensed multichannel data structure 118 that is associated with a particular section of the example environment 104 associated with a particular section of the grid 107. Thus, a particular box in a particular layer of the data structure 128 represents upsampled data associated with data collected by a particular sensor for a particular top-down section of the environment 104.

The upscaled multichannel data structure 128 may include various types of data for the individual boxes in the layers of the data structure. For example, the boxes of the upscaled multichannel data structure 128 may include data representing parameters associated with bounding boxes or detection boxes, such as center coordinates, center offset coordinates, yaw values (e.g., yaw in degrees and/or yaw plus 180 degrees), box length, box width, velocity, whether an object in the box is stationary (stationariness), any other motion state of the object, and/or any other suitable data.

At operation 130, the vehicle computing system may use the upscaled multichannel data structure generated at operation 124 to perform object detection, classification, and/or tracking.

An example 132 illustrates the vehicle 106 and the object 108. The vehicle computing system may have generated the detection box 134 associated with the object 108 using the upscaled multichannel data structure 128.

FIG. 2 illustrates a block diagram of an example architecture 200 of a deep tracking network that may include a CNN as discussed herein, and that may perform convolution and deconvolution operations for generating data that can be used to determine an estimated object detection. An example deep tracking network incorporating the learned upsampling transformation discussed herein is described in U.S. patent application Ser. No. 17/246,258 titled "Object Detection and Tracking, Including Parallelized Lidar Semantic Segmentation," which is incorporated by reference herein in its entirety and for all purposes.

In some examples, the example architecture 200 may be associated with one object classification or multiple object classifications. In other words, the example architecture 200 may receive and/or be trained on object detections associated with a particular object classification or the example architecture 200 may receive and/or be trained on object detections of various types of object classifications. In an example where the example architecture 200 is associated with one object classification (e.g., one of vehicles, pedestrians, bicyclists, etc.), the deep tracking network may include multiple instances of the example architecture 200 trained in association with the different object classifications. For example, the deep tracking network 210 may include one or more networks implementing the architecture 200 for coarse-grained vehicles, fine-grained vehicles, coarse-grained pedestrians and/or bicycles, and/or fine-grained pedestrians and/or bicycles.

The architecture 200 may include various layers, such as one or more convolution/deconvolution layers 212, an aggregation layer 213, one or more learned deconvolutional upsampling decoding layers 214, a classification layer 215, a regression layer 216, and/or an estimated object detection layer 217, although an additional or alternate number of sets of layers may be used. A layer may be a portion of an ML model, a subnetwork of a CNN, and/or a distinct network. The convolution/deconvolution layer(s) 212 may include one or more convolution layers and/or one or more deconvolution that may include learned parameters that may be tuned based on various criteria, including those described herein. The learned deconvolutional upsampling decoding layer(s) 214 may include one or more deconvolution layers that may include learned parameters such as a machine-learned upsampling transformation that may be machine learned and tuned based on various criteria, including as described herein.

In various examples, multichannel sensor data 201 may be provided as input to the convolution/deconvolution layer(s) 212 (e.g., as a three-dimensional data structure as described herein). The multichannel sensor data 201 may include sensor data (lidar data, radar data, sonar data, camera data, point cloud data (e.g., compressed point cloud data), sensor detections, environment data, one or more candidate bounding boxes, one or more candidate detection boxes, segmentation data, top-down segmentation (TDS) data, and/or any other data generated by one or more sensor systems and/or based on sensor data. In examples, the multichannel sensor data 201 may include and/or be based on a number of frames (e.g., 5, 10, 25, etc.) generated by one or more sensors and/or sensor systems. The multichannel sensor data 201 may include data representing top-down coordinates and/or a location in a grid of detected portions (e.g., box) of an environment as well as image and/or pixel data associated with such portions of the environment.

The convolution/deconvolution layer(s) 212 may perform various convolution and or deconvolution operations on the multichannel sensor data 201 and provide the resulting output to the aggregation layer 213 which may generate a condensed multichannel data structure that include condensed multichannel sensor data 202. The output of the convolution/deconvolution layer(s) 212 may be intermediate output that is used for functions other than, or in addition to, object detection. The condensed multichannel sensor data 202 may be used for various other processing activities and/or other functions, for example, by a vehicle computing system and/or within a neural network.

In examples, the condensed multichannel sensor data 202 may be provided as input to the learned deconvolutional upsampling decoding layer(s) 214. As described in detail herein, the learned deconvolutional upsampling decoding layer(s) 214 may perform one or more deconvolution operations using one or more learned parameters, such as a machine-learned upsampling transformation 203, to upsample the condensed multichannel sensor data 202 and generate upsampled multichannel sensor data 204. The upsampled multichannel sensor data 204 may be of a similar or same size (e.g., same number of layers and same number of data blocks per layer) as the multichannel sensor data 201.

The upsampled multichannel sensor data 204 may be provided as input to the classification layer(s) 215 and/or the regression layer(s) 216. The classification layer(s) 215 may include one or more components for performing classification tasks. In examples, the output of the classification layer(s) 215 may be a data structure of likelihoods indicating a likelihood that an associated portion of the environment is associated with a classification (e.g., occupied space, object classification, velocity bin, orientation bin, height bin, etc.). For example, a first set of layers of the classification layer(s) 215 may determine whether respective portions of the environment are occupied or unoccupied and/or associated with a respective object classification, another set of layers of the classification layer(s) 215 may determine whether the environment is associated with an estimated height bin, and so on. In examples, the output of the regression layer(s) 216 may be a field of values for tasks that are being regressed, such as a center offset, extent, velocity offset, orientation offset, height offset, and/or the like.

The various outputs of the classification layer(s) 215 and/or regression layer(s) 216 may be aggregated into an estimated object detection 217. In examples, the various outputs of the classification layer(s) 215 and/or regression layer(s) 216 may include multiple detection boxes and/or bounding boxes associated with one or more objects detected in an environment. In such examples, a non-maximum suppression (NMS) operation may be performed to determine a final detection box to represent a particular object detected in the environment.

Other operations may also, or instead, be performed to determine the estimated object detection 217. For example, such operations may include subtracting an offset from a bin value, determining an region of interest (ROI) using one or more various techniques applied to classification and/or regression outputs, determining that two or more ROIs are associated with articulated object based at least in part on the center offsets associated with the two or more ROIs and grouping the two or more ROIs into a single object detection, normalizing the outputs, and/or formatting the outputs into a common object detection format, such as a message for transmission on publish-subscribe network. In examples where a classification output comprises a bin and a regressed output comprises an offset, such as may be used for yaw, yaw rate, height, velocity, acceleration, object extents, and/or the like, the classification may indicate a bin, which may be a range of values (e.g., 0 to 5 meters, 0 to 10 miles per hour) and the (regressed) offset may specify a positive or negative value to be subtracted from a reference point of the bin. For example, the reference point may be a center value of the bin (e.g., 3 meters in a bin specifying a range of 0 to 5 meters) or an end of the bin (e.g., 0 meters or 5 meters in a bin specifying a range between 0 to 5 meters). Note that a pose indicated as part of the data structure output by the deep tracking network 210 as discussed herein may comprise a position, center, and/or orientation of an object (e.g., the orientation may comprise the yaw). In some examples, the pose may additionally or alternatively comprise extents of the object. The estimated object detection 217 may be provided to one or more components of a vehicle computing system, such as a data association component 220, for performing various vehicle functions.

Figure 3:
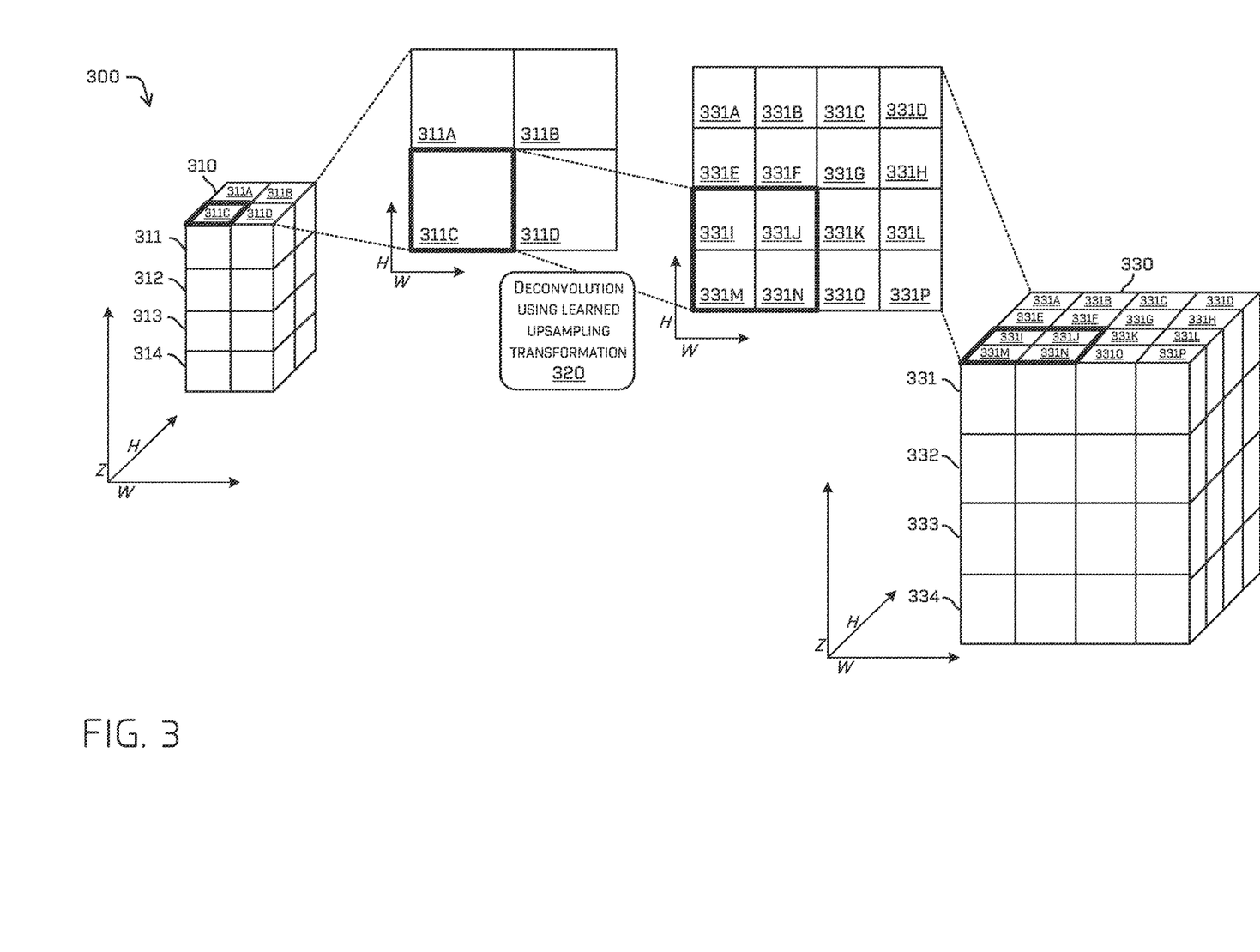
FIG. 3 is a diagrammatic representation of example data structures in a deconvolution process, in accordance with examples of the disclosure.

FIG. 3 illustrates an example 300 of data structures and portions of data structures generated and/or processed during a deconvolution process. A condensed multichannel data structure 310 may be generated by one or more convolution layers of a CNN. For example, one or more sensors configured at a vehicle may have detected environment data and generated frames of sensor data that a vehicle computing system may have then used to generate a multichannel data structure representing such sensor data. One or more convolution layers may have performed one or more convolution operations the multichannel data structure representing such sensor data to generate the condensed multichannel data structure 310. In examples, the condensed multichannel data structure 310 represents the same area in the environment as the original multichannel data structure but with a lower spatial resolution. For instance, individual boxes of the layers 311, 312, 313, and 314 of the condensed multichannel data structure 310 may include data representing five meter by five meter (5 m×5 m) top-down sections of an environment originally represented by boxes representing one meter by one meter (1 m×1 m) sections in the original multichannel data structure representing sensor data.

As with the original multichannel data structure, each of the layers along the z axis of the condensed multichannel data structure 310 may be associated with a particular sensor or sensor system and may include data generated by and/or associated with the sensor or sensor system associated with that layer. For example, the layer 311 may include data associated with a sonar sensor system, the layer 312 may include data associated with a lidar sensor system, the layer 313 may include data associated with a radar sensor system, the layer 314 may include data associated with an audio sensor system, etc. Individual layers of condensed multichannel data structure 310 may also, or instead, represent other types of data, such as time, features, map data, velocity, detection box parameters, etc.

The boxes delineated along the H and Y axes (representing the height and width of a top-down view) of the condensed multichannel data structure 310 may represent data associated with particular sections of a detected environment (e.g., sections of a superimposed grid). Thus, a particular box in a particular layer of the condensed multichannel data structure 310 represents data collected by a particular sensor for a particular top-down section of the environment.

For example, boxes 311A-D shown as the top layer 311 of the condensed multichannel data structure 31 may represent condensed data associated with data collected and/or generated by the sensor or sensor system associated with the layer 311. The individual boxes of boxes 311A-D may correspond to a particular (e.g., top-down) section of the environment. Each of the boxes 311A-D may include one or more types of condensed sensor data, including, but not limited to, coordinates (e.g., top-down coordinates, center coordinates, corner coordinates, etc.), center offset, dimensions (e.g., length, width), yaw values (e.g., yaw in degrees and/or yaw plus 180 degrees), velocity, a motion state (e.g., stationariness), etc.

In examples, one or more deconvolution operations 320 may be performed on the condensed multichannel data structure 310 using a learned upsampling transformation to generate an output multichannel data structure 330. The output multichannel data structure 330 may have the same or similar z axis (channel) layers as the condensed multichannel data structure 310, where the z axis layers 331, 332, 333, and 334 correspond to particular sensors or sensor systems that served as the source for data in those layers. The deconvolution operations 320 may expand the tensor dimensions of such layers to be the same or similar as the tensor dimensions of the corresponding layers in the multichannel data structure representing the original sensor data. Thus the output multichannel data structure 330 may have a spatial resolution (e.g., spatial resolution data) that is the same or similar to that of the multichannel data structure representing the original sensor data, thereby enabling more accurate object detection and localization.

For example, the deconvolution operations 320 may be performed on box 311C using a learned upsampling transformation and a kernel size of two by two (2×2) to generate the boxes 331L, 331J, 331M, and 331N of the layer 331 of the output multichannel data structure 330, as shown in the figure.

Varying values of stride (e.g., the distance between two consecutive positions of the kernel) may be used by the deconvolution operations 320 to generate the remainder of the layer 331 boxes. For example, using a stride value of two by two (2×2), the deconvolution operations 320 may be performed on box 311A using the learned upsampling transformation and the kernel size of two by two (2×2) to also generate the boxes 331A, 331B, 331E, and 331F. Similarly, the deconvolution operations 320 may be performed on box 311B using the learned upsampling transformation and the kernel size of two by two (2×2) to also generate the boxes 331C, 331D, 331G, and 331H, and so forth.

As described herein, the learned upsampling transformation may be a machine-learned deconvolution upsampling transformation determined using a ML model trained to output a deconvolution upsampling transformation. In examples, the ML model may be initialized with deconvolution parameters that may be based on an initial, static upsampling factor and then executed using a training set of data having variations of the initial, static upsampling factor until a highest quality machine-learned deconvolution upsampling transformation is detected. The training data may be generated and/or adjusted based on output of the ML model using an iterative process.

In examples, this ML model may perform variations of bilinear interpolation using the variations of the initial upsampling factor and/or weighting of various parameters to generate output datasets. A machine-learned deconvolution upsampling transformation used in an implemented learned deconvolutional upsampling decoding layer may be determined based on a comparison of the output of ML model to one or more criteria, such as the spatial resolution quality of the upsampled dataset resulting from deconvolution using a particular upsampling transformation as compared to the spatial resolution quality of upsampled datasets resulting from deconvolution using other upsampling factors.

In examples, the learned upsampling transformation can be learned during training of CNN. For example, training data can be input to a CNN, which can provide an output (e.g., a bounding box associated with an object in the environment, yaw, velocity, segmentation information, classification information, and the like). The output can be compared to ground truth data and a difference can be determined. The difference can be backpropagated as a loss throughout the network to change weights or values of parameters in various layers, including one or more deconvolution layers. In some examples, the loss may include an L1 loss, L2 loss, a cross-entropy loss, and the like. As the network is trained, the weights may be changed to decrease or minimize differences between outputs of the network and ground truth data.

FIG. 4 depicts a block diagram of an example system 400 for implementing the techniques described herein. In at least one example, the system 400 can include a vehicle 402. The vehicle 402 can include a vehicle computing device 404 that may function as and/or perform the functions of a vehicle controller for the vehicle 402. The vehicle 402 can also include one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422, a planning component 424, one or more system controllers 426, one or more maps 428, a prediction component 430, and a deep tracking network component 432. Though depicted in FIG. 4 as residing in memory 418 for illustrative purposes, it is contemplated that each of the localization component 420, the perception component 422, the planning component 424, the one or more system controllers 426, the one or more maps 428, the prediction component 430, and the deep tracking network component 432 can additionally, or alternatively, be accessible to the vehicle 402 (e.g., stored remotely).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 422 can provide processed sensor data that indicates one or more characteristics associated with a detected entity (e.g., a tracked object) and/or the environment in which the entity is positioned. The perception component 422 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. In examples, the planning component 424 can determine various routes and trajectories and various levels of detail. For example, the planning component 424 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

The memory 418 can further include one or more maps 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 428 can include at least one map (e.g., images and/or a mesh). In some examples, the vehicle 402 can be controlled based at least in part on the maps 428. That is, the maps 428 can be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 can be stored on a remote computing device(s) (such as the computing device(s) 442) accessible via network(s) 440. In some examples, multiple maps 428 can be stored based on, for example, a characteristic (e.g., type of entity, time of day, day of week, season of the year, etc.). Storing multiple maps 428 can have similar memory requirements but increase the speed at which data in a map can be accessed.

In general, the prediction component 430 can generate predicted trajectories of objects in an environment. For example, the prediction component 430 can generate one or more predicted trajectories for vehicles, pedestrians, animals, and the like within a threshold distance from the vehicle 402. In some instances, the prediction component 430 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 418 (and the memory 446, discussed below) can be implemented as a neural network. For instance, the memory 418 may include a deep tracking network 432 that may be configured with a convolutional neural network (CNN) 434. The CNN 434 may include one or more convolution/deconvolution layers 436 and/or one or more learned deconvolutional upsampling decoding layer(s) 438.

As described herein, an example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 440, to the one or more computing device(s) at a particular frequency, after a lapse of a predetermined period of time, in near real-time, etc.

The vehicle 402 can also include one or more emitters 408 for emitting light (visible and/or non-visible) and/or sound. The emitter(s) 408 in an example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data to one or more computing device(s) 442 via the network(s) 440. In some examples, the vehicle 402 can send raw sensor data to the computing device(s) 442. In other examples, the vehicle 402 can send processed sensor data and/or representations of sensor data (e.g., multichannel data structures representing sensor data) to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can include processor(s) 444 and a memory 446 storing a deep tracking network component 450 and/or a perception component 448. An example deep tracking network is described in U.S. patent application Ser. No. 17/246,258 titled "Object Detection and Tracking, Including Parallelized Lidar Semantic Segmentation," which is incorporated by reference herein in its entirety and for all purposes. In some instances, the deep tracking network component 450 can substantially correspond to the deep tracking network component 432 and can include substantially similar functionality. For example, the deep tracking network component 450 may include a convolutional neural network (CNN) 452 that may be configured with one or more convolution/deconvolution layers 454 and/or one or more learned deconvolutional upsampling decoding layer(s) 456. In some instances, the perception component 448 can substantially correspond to the perception component 422 and can include substantially similar functionality.

The processor(s) 416 of the vehicle 402 and the processor(s) 444 of the computing device(s) 442 can be any suitable processor capable of executing instructions to process data and perform operations as described herein. By way of example and not limitation, the processor(s) 416 and 444 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 446 are examples of non-transitory computer-readable media. The memory 418 and 446 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 442 and/or components of the computing device(s) 442 can be associated with the vehicle 402. That is, the vehicle 402 can perform one or more of the functions associated with the computing device(s) 442, and vice versa.

EXAMPLE CLAUSES

A: A system comprising: one or more processors; and one or more non-transitory computer-readable media storing instructions executable by the one or more processors, wherein the instructions, when executed, cause the system to perform operations comprising: receiving sensor data from a sensor associated with an autonomous vehicle in an environment: generating, based at least in part on the sensor data, a top-down multichannel data structure representing the environment, wherein a first discretized region of the top-down multichannel data structure represents a first area of the environment: inputting the top-down multichannel data structure into a convolutional neural network comprising a convolution layer: receiving, from the convolution layer, an intermediate data structure representing the environment, wherein a second discretized region of the intermediate data structure represents a second area that is larger than the first area: performing a deconvolution operation on the intermediate data structure using a machine-learned upsampling transformation to generate an upscaled multichannel data structure: outputting, by the convolutional neural network and based at least in part on the deconvolution operation, an object detection; and controlling the autonomous vehicle based at least in part on the object detection.

B: The system of paragraph A, wherein the upscaled multichannel data structure comprises a third discretized region representing a third area that is substantially similar to the first area.

C: The system of paragraph A or B, wherein: the upscaled multichannel data structure comprises a plurality of channels; and an individual channel of the plurality of channels of the upscaled multichannel data structure is associated with data associated with the sensor.

D: The system of any of paragraphs A-C, wherein the convolution layer is associated with a vehicle detection network.

E: The system of any of paragraphs A-D, wherein: the upscaled multichannel data structure comprises a plurality of channels; and an individual channel of the plurality of channels comprises data representing one or more of: center coordinates: center offset coordinates: dimensions: yaw: velocity: or a motion state.

F: The system of any of paragraphs A-E, wherein a parameter associated with the machine-learned upsampling transformation is changed during training based at least in part on a loss.

G: A method comprising: receiving sensor data from a sensor associated with an autonomous vehicle in an environment: generating, based at least in part on the sensor data, a tensor data structure representing the environment, wherein a first portion of the tensor data structure represents a first area of the environment: using a convolution layer of a convolutional neural network to generate an intermediate tensor data structure based at least in part on the tensor data structure, wherein a second portion of the intermediate tensor data structure represents a second area that is larger than the first area: performing a deconvolution operation on the intermediate tensor data structure using a machine-learned upsampling transformation to generate an upscaled tensor data structure; and controlling the autonomous vehicle based at least in part on the upscaled tensor data structure.

H: The method of paragraph G, wherein a parameter associated with the machine-learned upsampling transformation is changed during training based at least in part on a loss.

I: The method of paragraph G or H, wherein the upscaled tensor data structure comprises a third portion representing a third area that is substantially similar in size to the first area.

J: The method of any of paragraphs G-I, wherein: the sensor data comprises data generated by a plurality of sensors: the tensor data structure comprises a plurality of layers; and an individual layer of the plurality of layers of the tensor data structure is associated with data generated by an individual sensor of the plurality of sensors.

K: The method of paragraph J, wherein the plurality of sensors comprises one or more of: a lidar sensor: a radar sensor: a sonar sensor: an audio sensor: or a camera.

L: The method of any of paragraphs G-K, wherein: the upscaled tensor data structure comprises a plurality of layers; and an individual layer of the plurality of layers comprises data representing one or more of: center coordinates: center offset coordinates: dimensions: yaw: velocity: or a motion state.

M: The method of any of paragraphs G-L, further comprising detecting an object in the environment based at least in part on the upscaled tensor data structure.

N: The method of any of paragraphs G-M, further comprising tracking an object over time based at least in part on the upscaled tensor data structure.

O: One or more non-transitory computer-readable media storing instructions that, when executed by one or more processors, perform operations comprising: receiving sensor data from a sensor associated with an autonomous vehicle in an environment: generating, based at least in part on the sensor data, a data structure representing the, wherein a first discretized portion of the data structure represents a first area: using a convolution layer of a convolutional neural network to generate an intermediate data structure based at least in part on the data structure, wherein a second discretized portion of the intermediate data structure represents a second area that is larger than the first area: performing a deconvolution operation on the intermediate data structure using a machine-learned upsampling transformation to generate an upscaled data structure; and controlling the autonomous vehicle based at least in part on the upscaled data structure.

P: The one or more non-transitory computer-readable media of paragraph O, wherein the sensor comprises one or more of: a lidar sensor: a radar sensor: a sonar sensor: an audio sensor: or a camera.

Q: The one or more non-transitory computer-readable media of paragraph O or P, wherein: the operations further comprise detecting an object in the environment based at least in part on the upscaled data structure; and the object comprises one or more of: a vehicle: a bicycle: or a pedestrian.

R: The one or more non-transitory computer-readable media of any of paragraphs O-Q, wherein: the upscaled data structure comprises a plurality of layers; and an individual layer of the plurality of layers comprises data representing one or more of: center coordinates: center offset coordinates: dimensions: yaw: velocity: or a motion state.

S: The one or more non-transitory computer-readable media of any of paragraphs O-R, wherein the upscaled data structure comprises a third discretized portion representing a third area that is substantially similar to the first area.

T: The one or more non-transitory computer-readable media of any of paragraphs O-S, wherein a parameter associated with the machine-learned upsampling transformation is changed during training based at least in part on a loss.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving sensor data from a sensor associated with an autonomous vehicle in an environment;
      generating, based at least in part on the sensor data, a top-down multichannel data structure of a first size representing the environment in a first resolution, wherein a first discretized region of the top-down multichannel data structure represents a first area of the environment;
      inputting the top-down multichannel data structure into a convolutional neural network comprising a convolution layer;
      receiving, from the convolution layer, an intermediate data structure of a second size representing the environment in a second resolution, wherein the second size is less than the first size, the second resolution is lower than the first resolution, and a second discretized region of the intermediate data structure represents a second area that is larger than the first area;
      performing a deconvolution operation on the intermediate data structure using a machine-learned upsampling transformation to generate an upscaled multichannel data structure of the first size representing the environment in the first resolution;
      outputting, by the convolutional neural network and based at least in part on the deconvolution operation, an object detection; and
      controlling the autonomous vehicle based at least in part on the object detection.

2. The system of claim 1, wherein the upscaled multichannel data structure comprises a third discretized region representing a third area that is substantially similar to the first area.

3. The system of claim 1, wherein:
   the upscaled multichannel data structure comprises a plurality of channels; and
   an individual channel of the plurality of channels of the upscaled multichannel data structure is associated with data associated with the sensor.

4. The system of claim 1, wherein the convolution layer is associated with a vehicle detection network.

5. The system of claim 1, wherein:
   the upscaled multichannel data structure comprises a plurality of channels; and
   an individual channel of the plurality of channels comprises data representing one or more of:
      center coordinates;
      center offset coordinates;
      dimensions;
      yaw;
      velocity; or
      a motion state.

6. The system of claim 1, wherein a parameter associated with the machine-learned upsampling transformation is changed during training based at least in part on a loss.

7. A method comprising:
   receiving sensor data from a sensor associated with an autonomous vehicle in an environment;
   generating, based at least in part on the sensor data, a tensor data structure of a first size representing the environment at a first resolution, wherein a first portion of the tensor data structure represents a first area of the environment;
   using a convolution layer of a convolutional neural network to generate an intermediate tensor data structure of a second size representing the environment in a second resolution and based at least in part on the tensor data structure, wherein the second size is less than the first size, the second resolution is lower than the first resolution, and a second portion of the intermediate tensor data structure represents a second area that is larger than the first area;

performing a deconvolution operation on the intermediate tensor data structure using a machine-learned upsampling transformation to generate an upscaled tensor data structure of the first size representing the environment in the first resolution; and controlling the autonomous vehicle based at least in part on the upscaled tensor data structure.

8. The method of claim 7, wherein a parameter associated with the machine-learned upsampling transformation is changed during training based at least in part on a loss.

9. The method of claim 7, wherein the upscaled tensor data structure comprises a third portion representing a third area that is substantially similar in size to the first area.

10. The method of claim 7, wherein:
the sensor data comprises data generated by a plurality of sensors;
the tensor data structure comprises a plurality of layers; and
an individual layer of the plurality of layers of the tensor data structure is associated with data generated by an individual sensor of the plurality of sensors.

11. The method of claim 10, wherein the plurality of sensors comprises one or more of:
a lidar sensor;
a radar sensor;
a sonar sensor;
an audio sensor; or
a camera.

12. The method of claim 7, wherein:
the upscaled tensor data structure comprises a plurality of layers; and
an individual layer of the plurality of layers comprises data representing one or more of:
center coordinates;
center offset coordinates;
dimensions;
yaw;
velocity; or
a motion state.

13. The method of claim 7, further comprising detecting an object in the environment based at least in part on the upscaled tensor data structure.

14. The method of claim 7, further comprising tracking an object over time based at least in part on the upscaled tensor data structure.

15. One or more non-transitory computer-readable media storing instructions that, when executed by one or more processors, perform operations comprising:
receiving sensor data from a sensor associated with an autonomous vehicle in an environment;
generating, based at least in part on the sensor data, a data structure of a first size representing the environment at a first resolution, wherein a first discretized portion of the data structure represents a first area;
using a convolution layer of a convolutional neural network to generate an intermediate data structure of a second size representing the environment at a second resolution and based at least in part on the data structure, wherein the second size is less than the first size, the second resolution is lower than the second resolution, and a second discretized portion of the intermediate data structure represents a second area that is larger than the first area;
performing a deconvolution operation on the intermediate data structure using a machine-learned upsampling transformation to generate an upscaled data structure of the first size representing the environment at the first resolution; and
controlling the autonomous vehicle based at least in part on the upscaled data structure.

16. The one or more non-transitory computer-readable media of claim 15, wherein the sensor comprises one or more of:
a lidar sensor;
a radar sensor;
a sonar sensor;
an audio sensor; or
a camera.

17. The one or more non-transitory computer-readable media of claim 15, wherein:
the operations further comprise detecting an object in the environment based at least in part on the upscaled data structure; and
the object comprises one or more of:
a vehicle;
a bicycle; or
a pedestrian.

18. The one or more non-transitory computer-readable media of claim 15, wherein:
the upscaled data structure comprises a plurality of layers; and
an individual layer of the plurality of layers comprises data representing one or more of:
center coordinates;
center offset coordinates;
dimensions;
yaw;
velocity; or
a motion state.

19. The one or more non-transitory computer-readable media of claim 15, wherein the upscaled data structure comprises a third discretized portion representing a third area that is substantially similar to the first area.).

20. The one or more non-transitory computer-readable media of claim 15, wherein a parameter associated with the machine-learned upsampling transformation is changed during training based at least in part on a loss.

* * * * *